J. B. CORSER.
ATTACHMENT FOR MOTOR VEHICLES.
APPLICATION FILED NOV. 12, 1914.
1,148,759.
Patented Aug. 3, 1915.
2 SHEETS—SHEET 1.
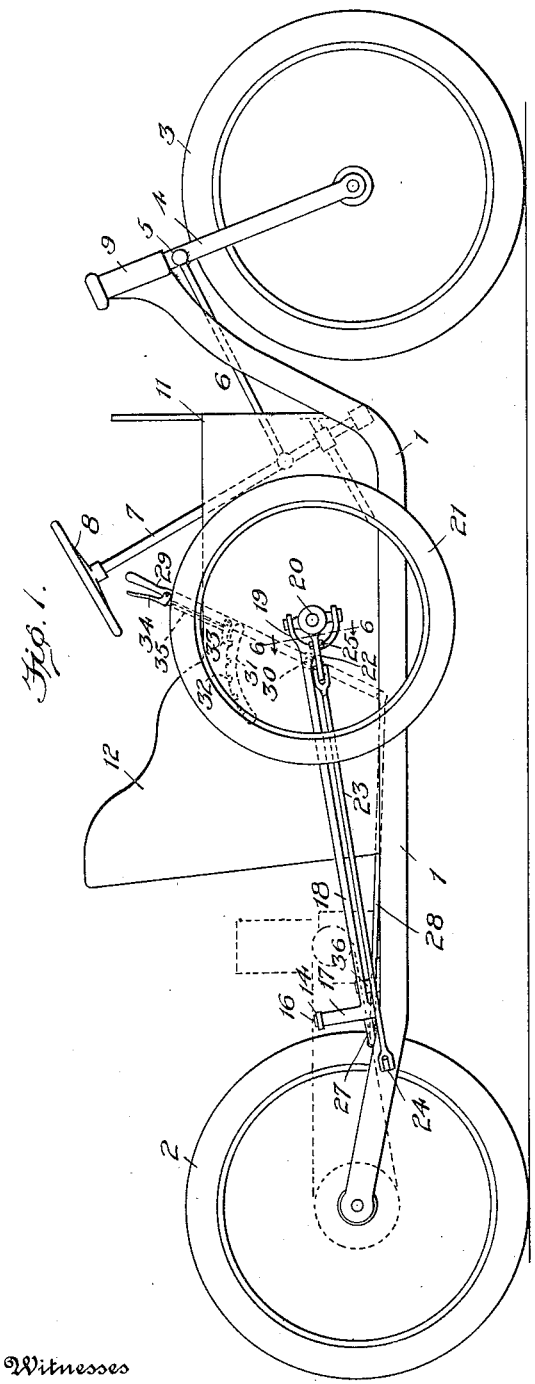
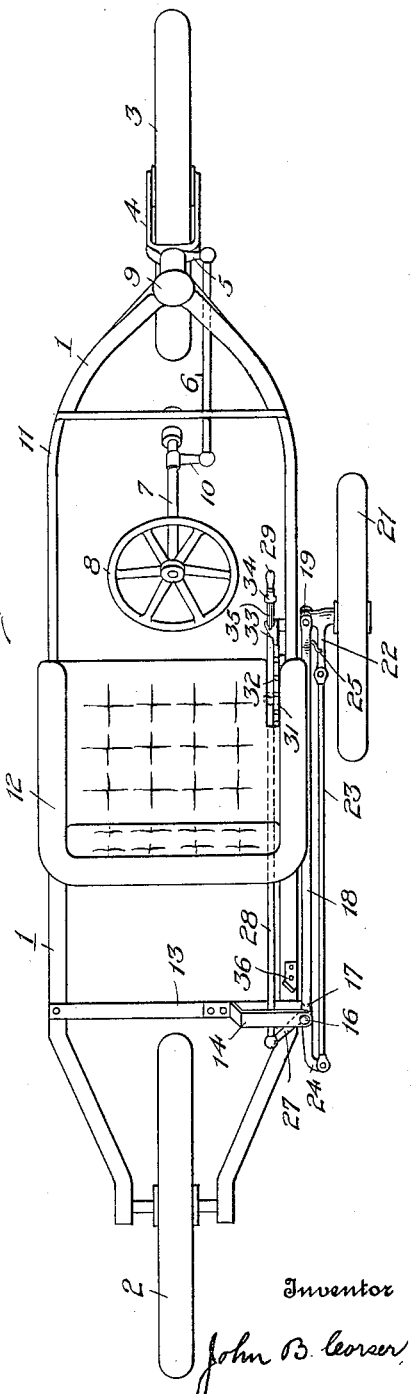
Witnesses
Thomas Durant
F. E. Ruth.
Inventor
John B. Corser
By Church & Church
his Attorneys

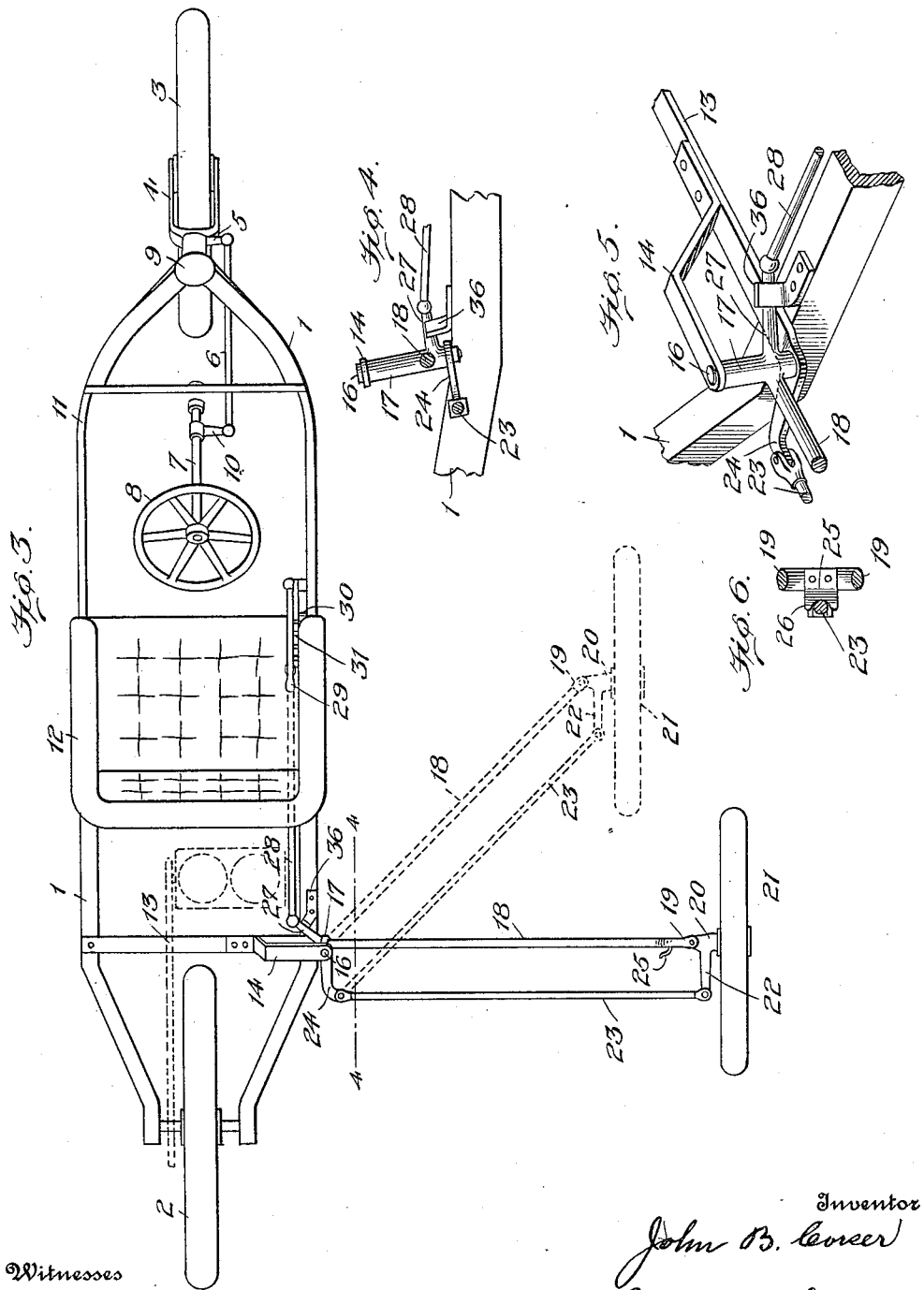

UNITED STATES PATENT OFFICE.

JOHN B. CORSER, OF SCRANTON, PENNSYLVANIA.

ATTACHMENT FOR MOTOR-VEHICLES.

1,148,759.  Specification of Letters Patent.  Patented Aug. 3, 1915.

Application filed November 12, 1914. Serial No. 871,723.

*To all whom it may concern:*

Be it known that I, JOHN B. CORSER, a citizen of the United States, residing at Scranton, in the county of Lackawanna and State of Pennsylvania, have invented certain new and useful Improvements in Attachments for Motor-Vehicles; and I do hereby declare the following to be a full, clear, and exact description of the invention, such as will enable others skilled in the art to which it appertains to make and use the same, reference being had to the accompanying drawing and the characters of reference thereon.

This invention relates to improvements in motor-cycles, and has for its primary object the causing of the vehicle to function substantially as a cycle car without the additional weight or expense incident to the construction of the ordinary cycle car.

With this and further objects in view as will hereinafter in part be apparent and in part be stated, the invention comprises certain novel constructions, combinations and arrangements of parts as subsequently specified and claimed.

In the accompanying drawing:—Figure 1 is a view in side elevation of a vehicle embodying the features of the present invention, the stay frame and wheel being shown in collapsed position. Fig. 2 is a top plan view thereof. Fig. 3 is a similar view with the stay frame and wheel extended in full lines and partially collapsed in dotted lines. Fig. 4 is an enlarged detail fragmentary section taken on the plane indicated by line 4—4 of Fig. 3 and looking toward the main frame of the machine. Fig. 5 is a perspective view of the part seen in Fig. 4. Fig. 6 is an enlarged detail fragmentary cross section taken approximately on the plane indicated by line 6—6 of Fig. 1 and looking in the direction of the arrow.

Referring to the drawing by numerals, 1 indicates a main frame of a vehicle, which is sustained by a rear supporting and driving wheel 2, and a front supporting and steering wheel 3, the latter being journaled in a fork 4 of the type ordinarily employed in motor-cycles but provided with a steering arm 5 engaged by steering link 6, which extends to a steering post 7 carrying a steering wheel 8. The fork 4 is, of course, journaled in an appropriate head 9 of frame 1 and the link 6 is connected with the steering post 7 through an arm 10 so that shifting of the wheel 8 will affect relative movement of wheel 3 and enable steering of the machine. The post 7 is journaled in a portion of frame 1. The main body of the frame 1 consists of a pair of side bars spaced apart for a portion of their length and on which is mounted a car body 11, provided with a seat 12, which may be of various forms, but preferably consists of an individual, cushioned seat adapted to accommodate the driver. Of course, an ordinary motor-cycle saddle could be employed but one of the features of advantage of the present improvement resides in enabling the use of a large, commodious seat for the user, which seat may be occupied by him while the vehicle is standing still as well as while running.

Preferably at the rear of the seat 12, a cross bar 13 is fixed to the frame 1 and a brace or strap 14 is fixed to one end portion of the bar 13, the free end of the brace and the corresponding portion of the bar being connected by a bearing pin 16, surrounded by a bearing sleeve 17. Formed integral with or otherwise appropriately fixed to the sleeve 17 is a rod 18 extending at right angles to the axis of the sleeve and having its outer end bifurcated as indicated at 19. Between the arms of the bifurcation 19, is pivoted an axle 20, carrying a stay wheel 21, the rod 18 and its coöperating parts comprising a stay frame for enabling maintenance of the vehicle in upright position while stationary or moving, as will become apparent. An arm 22 is formed integral with or appropriately fixed to axle 20 and extends substantially at right angles to the longitudinal axis of the axle. The outer end of the arm 22 is pivotally engaged by a link 23, which is pivotally connected to an arm 24, formed integral with or fixedly carried by the bar 13 and extending substantially at right angles to the main body of the bar, that is, extending along the main frame 1. The arms 22 and 24 are substantially equal in length so that the link 23 lies approximately parallel with rod 18 and in operation maintains substantial parallelism therewith as indicated in dotted lines in Fig. 3 and in full lines in Fig. 2.

Fixed to rod 18 within the bifurcation 19 is a spring plate bracket 25, which extends rearward and is provided at its free end with a substantial semi-circular recess or notch 26, adapted to receive the arm 22 when the parts are folded, as indicated Figs. 6, 1 and 2, whereby the pivot between link 23 and arm 22 is prevented from moving inwardly when the parts are collapsed as seen in Fig. 2, to a point beyond an alinement with the pivot between link 23 and arm 24. Such inward movement of the pivot between arm 22 and link 23 would result in locking the supplemental or stay frame carrying the stay wheel 21 against outward movement. The spring bracket 25 thus effectively maintains the parts while collapsed in position for readily unfolding when pressure is exerted on rod 18, tending to swing the same outward. To facilitate effecting such pressure on rod 18, the sleeve 17 carries an operating arm 27, which arm is formed integral with or appropriately fixed to the sleeve at one end and at the other end is pivoted to an operating link 28, which link extends forward along frame 1 to a point near the front portion of seat 12 and there pivotally engages an operating lever 29. The lever 29 is pivoted at 30 to the frame 1 and extends past a rack 31, preferably arcuate and provided with pawl receiving notches 32. A pawl 33 is carried by lever 29 and engages rack 31, and an operating grip 34 is pivoted to lever 29 and connected by a link 35 with pawl 33 for enabling the operator when grasping the lever 29 to press the grip 34 and thus lift the pawl 33 and allow the lever 29 to be shifted for positioning the pawl in a forward or rearward notch 32. It is obvious, of course, that when the lever 29 is shifted to the extreme of rearward movement, the arm 27 will be advanced to the forward extreme of its movement and therefore, will have caused rotation of sleeve 17 to an extent for swinging rod 18 to its normal outstanding position substantially at right angles to the longitudinal axis of the main frame of the machine. To prevent any possible movement of arm 18 rearward beyond this normal position, a bracket 36 is fixed to frame 1 in position for being struck by arm 27 at the extreme of its forward movement.

The enginery for driving the vehicle has not been illustrated but is mounted in the frame 1 appropriately, as, for instance, in the rear of the seat 12 and is geared to drive wheel 2 in the usual manner of an ordinary motor-cycle.

In operation, the parts being disposed as indicated in full lines in Fig. 1, the operator starts his engine, assumes the seat 12, closes his clutch, and then pushes the lever 29 forward for causing the stay frame and wheel to be swung into the side of the machine as indicated in Figs. 1 and 2. It is to be observed that the sleeve is disposed with the axis of its movement inclined, as clearly seen in Figs. 1 and 4, so that as the stay frame is swung inward it, at the same time, has its outer end portion moved upward until the wheel 21, when the parts are completely collapsed, is clear of the ground and at a sufficient distance above the ground to be substantially free from liability of striking obstructions along a roadway. The operator then runs the vehicle in the same manner as the operating of a motor-cycle until he desires to stop the vehicle, whereupon he first moves the lever 29 rearward. This swings the stay frame to its outstanding position, the wheel 21 being lowered as it moves outward because of the incline of the axis on which the frame swings, until the wheel rests upon the ground as the arm 27 strikes bracket 36 and the wheel is in position for carrying part of the load of the vehicle. The operator then releases his clutch or shifts his gear to neutral or stops his engine, and may then remain seated since the vehicle is sustained in its upright position by the stay frame and wheel. It is obvious that the stay or supplemental frame is essentially adapted to maintain the wheel 21 with its sides at all times parallel to the longitudinal vertical planes of the main frame, so that should the car be tilted slightly to one side while the supplemental frame is only partly extended, the wheel 21 would be in position for operation.

The stay frame and wheel may be employed for sustaining the vehicle in upright position when stopping or starting when riding through muddy or rough roads or when very low speed is desired.

What I claim is:—

1. In an attachment for motor cycles, the combination with a frame, of a link pivoted to a fixed part of the frame, a sleeve journaled on the frame on an inclined axis and spaced from the pivot of said link, a rod fixed to the sleeve, an axle pivoted to the rod and having an arm pivoted to the link at a distance from the rod substantially equal to the distance from the sleeve to the first mentioned pivot of the link, a wheel journaled on the axle and means for imparting rotary movement to the sleeve.

2. In an attachment for motor cycles, the combination, with a frame, of a link pivoted to a fixed part of the frame, a sleeve journaled on the frame and spaced from the pivot of said link, a rod fixed to the sleeve, an axle pivoted to the rod and having an arm pivoted to the link at a distance from the rod substantially equal to the distance from the sleeve to the first mentioned pivot of the link, a wheel journaled on the axle, and means for imparting rotary movement to the sleeve.

3. In an attachment for motor cycles, the combination, with a frame, of a link pivoted to a fixed part of the frame, a sleeve journaled on the frame and spaced from the pivot of said link, a rod fixed to the sleeve, an axle pivoted to the rod and having an arm pivoted to the link at a distance from the rod substantially equal to the distance from the sleeve to the first mentioned pivot of the link, a wheel journaled on the axle, means for imparting rotary movement to the sleeve, the rod and link being adapted to be swung into substantial parallelism with the frame, and means for preventing the pivotal connection of the link with the arm of the axle from moving inwardly beyond alinement with the other pivot of the link.

4. In an attachment for motor cycles, the combination, with a frame, of a link pivoted to a fixed part of the frame, a sleeve journaled on the frame and spaced from the pivot of said link, a rod fixed to the sleeve, an axle pivoted to the rod and having an arm pivoted to the link at a distance from the rod substantially equal to the distance from the sleeve to the first mentioned pivot of the link, a wheel journaled on the axle, means for imparting rotary movement to the sleeve, the rod and link being adapted to be swung into substantial parallelism with the frame, and a spring carried by the rod and disposed to interrupt inward movement of the link substantially at the terminus of the collapsing movement thereof for preventing the pivot between the link and arm of the axle from moving inwardly beyond alinement with the other pivot of the link.

5. In an attachment for motor cycles, the combination, with a main frame, of a supplemental stay frame therefor pivoted to the main frame, an arm connected with the supplemental frame and extending beyond the pivot thereof, means for actuating the arm for swinging the supplemental frame on its pivot, and a stop on the frame at that point in the path of movement of the arm represented by a substantial right angle position of the supplemental frame with respect to the main frame.

6. In an attachment for motor cycles, the combination, with a main frame, of a supplemental frame pivoted to the main frame, a supporting wheel journaled at the outer portion of the supplemental frame, an arm fixed to the supplemental frame and extending inwardly beyond the pivotal connection of the supplemental frame, a link pivoted to the arm, a lever pivoted to the link, and locking means for detachably retaining the lever at either of the extremes of its movement.

JOHN B. CORSER.

Witnesses:
 WM. B. LANDIS,
 MABEL FAIRFIELD.

Copies of this patent may be obtained for five cents each, by addressing the "Commissioner of Patents, Washington, D. C."